(12) United States Patent
Brill et al.

(10) Patent No.: US 6,868,748 B2
(45) Date of Patent: Mar. 22, 2005

(54) COMPOUND GEAR JOINING

(75) Inventors: Lawrence D. Brill, Westerville, OH (US); Brian D. Hayes, Newark, OH (US); Tomaz Dopico Varela, Gahanna, OH (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 10/428,539

(22) Filed: May 2, 2003

(65) Prior Publication Data

US 2004/0216545 A1 Nov. 4, 2004

(51) Int. Cl.[7] .............................................. F16H 57/00
(52) U.S. Cl. ......................................... 74/411; 74/410
(58) Field of Search ......................... 74/392, 396, 406, 74/410, 411, 412 R, 413, 421 R; 464/157

(56) References Cited

U.S. PATENT DOCUMENTS

| | | | |
|---|---|---|---|
| 2,613,781 A | * | 10/1952 | Polomski et al. ......... 74/421 R |
| 4,485,686 A | * | 12/1984 | Olmstead et al. ............. 74/410 |
| 4,583,413 A | * | 4/1986 | Lack ............................. 74/410 |
| 4,677,868 A | * | 7/1987 | Filkins ......................... 74/411 |
| 4,876,908 A | * | 10/1989 | Pengilly ....................... 74/410 |
| 5,146,804 A | * | 9/1992 | Carmillet ...................... 74/411 |
| 5,214,975 A | * | 6/1993 | Zalewski ...................... 74/411 |
| 5,222,407 A | * | 6/1993 | Sekiguchi ..................... 74/411 |
| 5,791,190 A | * | 8/1998 | Konno ......................... 74/411 |
| 5,904,632 A | | 5/1999 | Brown et al. |
| 5,905,927 A | * | 5/1999 | Inoue et al. ................. 464/157 |
| 5,956,998 A | * | 9/1999 | Fenelon ....................... 74/411 |
| 6,254,196 B1 | | 7/2001 | Gee |
| 6,510,911 B1 | | 1/2003 | Satou et al. |

* cited by examiner

*Primary Examiner*—Sherry Estremsky
(74) *Attorney, Agent, or Firm*—Carlson, Gaskey & Olds, P.C.

(57) ABSTRACT

A compound gear assembly includes two gears, each gear respectively including interlocking features, which may be complimentary arcuate sections, for transferring torque between the gears. A clearance between the respective arcuate sections permits the gears to move radially relative to one another, which ensures that the gears mesh in a desired manner with the gears to which they are coupled. A retainer is inserted into an annular groove located circumferentially about the respective arcuate sections, which secures one gear to another.

14 Claims, 2 Drawing Sheets

COMPOUND GEAR JOINING

BACKGROUND OF THE INVENTION

The present invention relates to compound gear assemblies, and more particularly to a method of joining two gears to form a compound gear assembly, as an alternative to splining, which is more flexible and less expensive to manufacture.

Compound gear assemblies, as known in the prior art, consist of two or more gears splined to one another. The compound gear assembly is coupled to input and output gears. In one known arrangement, a first gear includes a splined nose. The first gear includes teeth that are finish ground prior to assembly with a second gear. A second gear includes an inner diameter that is splined to interfit with the nose of the first gear in a press fit relationship. The second gear includes teeth that are rough machined prior to assembly but must be finish ground after assembly to ensure alignment with the first gear. In this manner, the first and second gears are arranged concentrically with one another to ensure desired meshing between the first and second gears and the input and output gears to which they are coupled.

To ensure desired alignment between the first and second gears, the prior art method of joining gears involves expensive grinding in that one gear must be precision ground after assembly to the other gear to ensure proper alignment. Furthermore, if a press fit is required, then the splines must also be finished ground prior to assembly. In addition, the commonly used spline method results in a very rigid gear assembly that does not allow self alignment between the two gears. More specifically, the rigidity of the gear assembly does not allow for any relative movement between the first and second gears in relation to the input and output gears with which they mesh.

Accordingly, it is desirable to provide a method of gear assembly which provides an assembly that is flexible enough to be self aligning and to allow the gears to be manufactured independently of one another.

SUMMARY OF THE INVENTION

The gear joining method according to the present invention provides a cost effective alternative to splining two gears to one another. In addition, the present invention also provides a compound gear assembly which is self-aligning.

The preferred embodiment includes two gears, each gear respectively including interlocking features, which may be complimentary arcuate sections, for transferring torque between the gears. A clearance between the respective arcuate sections permits the gears to move radially relative to one another, which ensures that the gears mesh in a desired manner with the gears to which they are coupled. A snap ring is inserted into an annular groove located circumferentially about the respective arcuate sections, which secures one gear to another.

The inventive coupling arrangement between the gears provides for self-alignment of the assembly. There are two main cost advantages associated with making the assembly self-aligning. First, the need to finish machine and grind the second gear after assembly is eliminated, which significantly reduces the cost to manufacture by allowing the gears to be machined and ground independent of one another. Second, the need for the splines has been eliminated. The interlocking features can be machined before heat treat or even precision forged, both of which are much less expensive than finish grinding.

The present invention therefore provides a cost effective solution to splining two gears.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
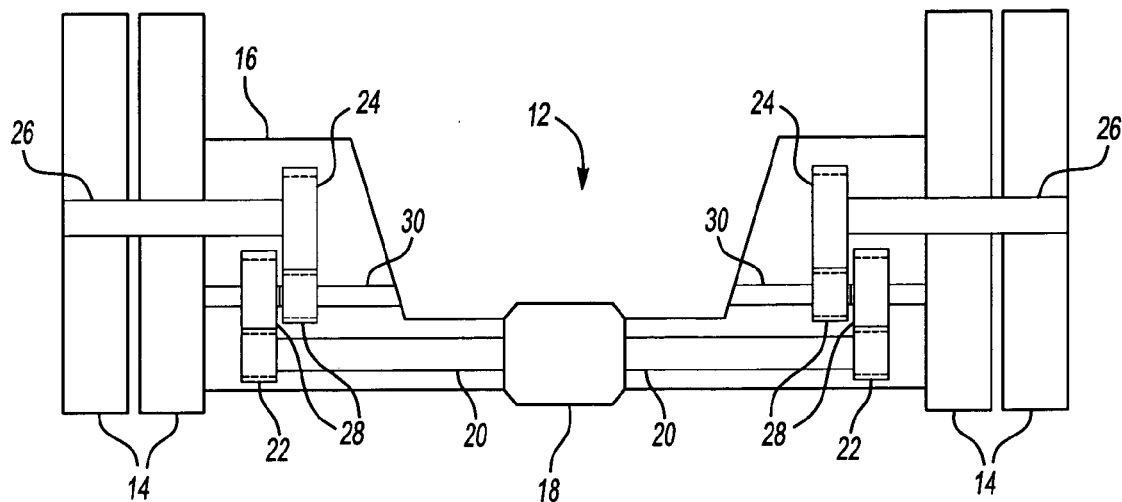
FIG. 1 is a general perspective view of an inverted portal axle assembly which incorporates the compound gear assembly of the present invention.

Vehicles, such as buses, incorporate an inverted portal axle 12, shown in FIG. 1, to facilitate use of a low floor in a center aisle of the bus. The inverted portal axle 12 includes a pair of wheel end assemblies 14 supported on an axle housing 16. A differential 18 is positioned near one of the wheel end assemblies 14 and axle shafts 20 connect the differential 18 to the outboard wheel end assemblies 14. Drive gears 22 are mounted to the outboard ends of the axle shafts 20. Driven gears 24 are mounted on drive shafts 26 which support the wheel end assemblies 14. A compound gear assembly 28 of the present invention is mounted to the axle housing 16 by a housing shaft 30 to increase torque from the drive gears 22 to the driven gears 24. Gear teeth are not shown in the Figures for clarity.

Figure 2:
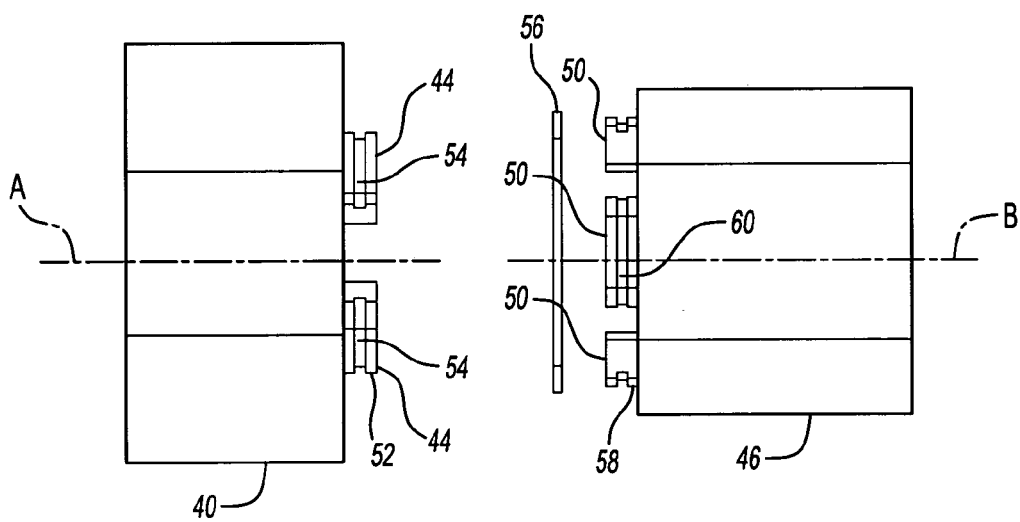
FIG. 2 is an exploded view of the compound gear assembly.

FIG. 2 illustrates an exploded view of the compound gear assembly 28 from FIG. 1 having first 40 and second 46 gears. The first gear 40, or input gear defines a first axis A and comprises a first set of interlocking features 44. The second gear 46, or output gear, defines a second axis B and comprises a second set of interlocking features 50. The first 40 and second 46 gears are mechanically coupled to one another against relative rotation with the interlocking features, which also permit limited relative radial movement enabling the gears to align with one another.

The first set of interlocking features 44 may be arcuate protrusions having a first outer circumference surface 52 with a first groove 54 located in the first outer circumference surface 52. Similarly, the second set of interlocking features 50 includes arcuate protrusions having a second outer circumference surface 58 with a second groove 60 located in the second outer circumference surface 58. One of ordinary skill in the art will appreciate that the interlocking features may be other suitable shapes. The first 54 and second 60 grooves are aligned with one another when assembled to receive a retainer 56 that locks the first 40 and second 46 gears to one another. The retainer 56 may be a flexible C-clip with a circular cross-section that seats in a complementary shaped arcuate groove. Other retainer configurations may also be used.

Figure 3:
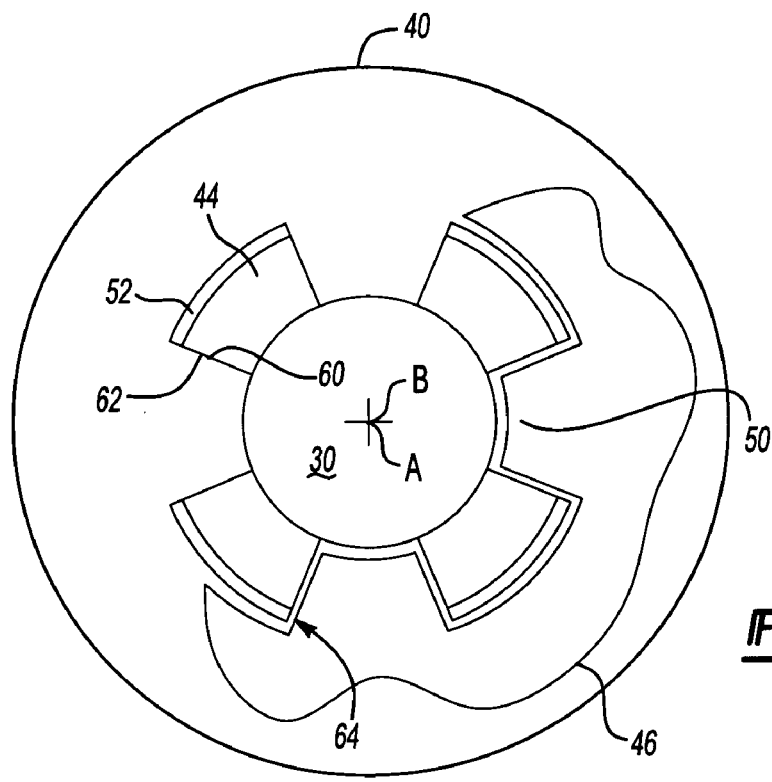
FIG. 3 is a side view of the first gear further defining the interlocking features.

FIG. 3 shows a cross-section of the first 40 and second 46 gears through the interlocking features. Each interlocking feature 44 is an arcuate section defined by the first outer circumference surface 52, in inner surface that receives the housing shaft 30, and opposing faces 60 and 62. The interlocking features 50 of the second gear 46 are similarly defined. The first set of interlocking features 44 and second set of interlocking features 50 are arranged in alternating relationship such that the interlocking features 44 of the first gear 40 engage the interlocking features 50 of the second gear 46. The opposing faces define a plane that intersects the axes A, B to better facilitate radial movement of the gears relative to one another. The axes A, B may lie within the planes. While each gear is shown as having four arcuate sections, any other suitable number may be used.

A clearance 64 is located between the interlocking features 44 and 50 of the gears to provide for relative movement of the gears in relation to one another. The clearance 64 is sized to permit relative radial movement between the gears so that the gears will self-align relative to one another and achieve desired engagement to the gears to which they are coupled. However, it is desirable to minimize the clearance 64 to avoid excessive noise between the first 40 and second 46 gears.

Figure 4:
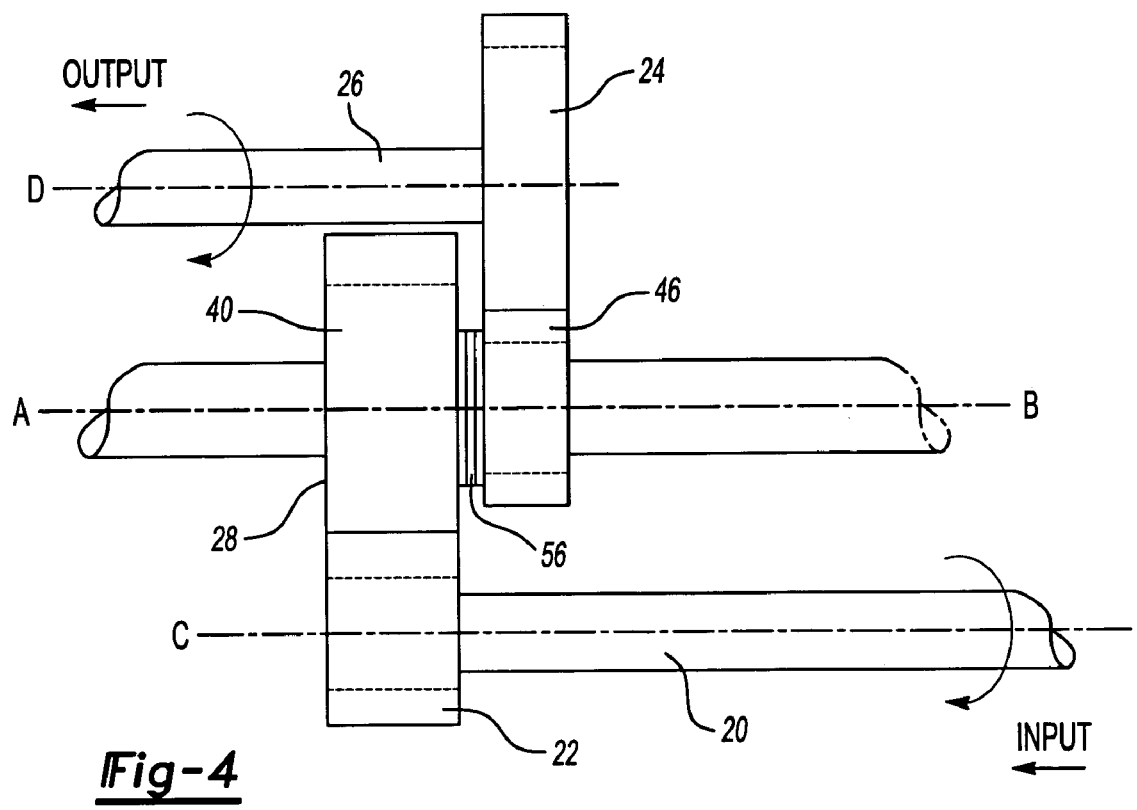
FIG. 4 is a gear train comprising the compound gear assembly of the present invention.

FIG. 4 further illustrates a gear train. The drive gear 22 defines a third axis C which is mounted on the drive shaft 20 to provide a torque input. Torque is transmitted though the drive gear 22 to the compound gear assembly 28 for gear reduction and to further transmit the torque to the driven gear 24, which defines a fourth axis D. The compound gear assembly 28 may be supported on the housing shaft 30 by bearings, which are not shown. The driven gear 24 is mounted on the drive shaft 26, which transmits the reduced torque to an output.

The clearance 64, as shown in FIG. 3, provides for relative movement between the first axis A of the first gear 40 and the second axis B of the second gear 46. In addition, the first axis A is moveable with respect to the third axis C. Furthermore, the second axis B defined by the second gear 46 is moveable with respect to the fourth axis D. The relative movement of these axes provides improved engagement between both the drive gear 22 and the first gear 40 and the driven gear 24 and the second gear 46.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A gear assembly comprising:
   first and second gears respectively defining first and second axes;
   first and second interlocking features respectively arranged on said first and second gears engaging one another for transferring torque between said first and second gears, and a clearance arranged between said first and second interlocking features permitting relative movement between said first and second axes, wherein said relative movement is radial; and
   a retainer in engagement with said first and second interlocking features securing said first and second gears to one another.

2. A gear assembly as recited in claim 1 wherein said first and second interlocking features respectively include first and second protrusions arranged in relation to one another.

3. A gear assembly as recited in claim 2 wherein said first and second protrusions are arcuate sections.

4. A gear assembly as recited in claim 3 wherein said arcuate sections are further defined by faces lying in planes intersecting said first and second axes.

5. A gear assembly as recited in claim 2 wherein said first and second gears define opposing faces transverse to said first and second axes and outer circumference surfaces adjoining said faces.

6. A gear assembly comprising:
   first and second gears respectively defining first and second axes; and
   first and second interlocking features respectively arranged on said first and second gears engaging one another for transferring torque between said first and second gears, and a clearance arranged between said first and second interlocking features permitting relative movement between said first and second axes, wherein said relative movement is radial;
   a retainer in engagement with said first and second interlocking features securing said first and second gears to one another; and
   wherein the first and second interlocking features include grooves in surfaces of said first and second interlocking features, said retainer installed into said groove.

7. A gear assembly as recited in claim 6 wherein said surfaces are outer circumference surfaces provided by said protrusions.

8. A gear assembly comprising:
   first and second gears respectively defining first and second axes;
   first and second interlocking features respectively arranged on said first and second gears engaging one another for transferring torque between said first and second gears, and a clearance arranged between said first and second interlocking features permitting relative movement between said first and second axes; and
   a retainer in engagement with said first and second interlocking features securing said first and second gears to one another, wherein said retainer is C-shaped.

9. A gear train comprising:
   a shaft;
   input and output gears adjacent one another supported on said shaft, said input and output gears respectively defining first and second axes;
   first and second interlocking features respectively arranged on said input and output gears engaging one another for transferring torque between said input and output gears, and a clearance arranged between said first and second interlocking features permitting a relative movement between said first and second axes; and
   a retainer securing said first and second interlocking features to one another.

10. A gear train as recited in claim 9 wherein said relative movement is radial.

11. A gear train as recited in claim 9 further comprising:
    a drive gear defining a third axis substantially parallel to said first axis, said drive gear mounted on a drive shaft and engaging said input gear to transfer torque, said first axis being moveable in relation to said third axis to provide desired engagement between said drive gear and said input gear; and a driven gear defining a fourth axis substantially parallel to said second axis, said driven gear mounted on an driven shaft and engaging said output gear to transfer torque, said second axis being moveable in relation to said fourth axis to provide desired engagement between said output gear and said driven gear.

12. A gear train as recited in claim 9 further comprising first and second bearings respectively located between said input and output gears and said shaft.

13. A gear assembly comprising:

first and second gears respectively defining first and second axes;

first and second interlocking features respectively arranged on said first and second gears engaging one another for transferring torque between said first and second gears; and a retainer securing said first and second gears to one another, and constraining said first and second gears against relative axial movement.

14. A gear assembly as recited in claim 13 wherein said retainer permits relative radial movement between first and second axes.

* * * * *